United States Patent [19]

Takeuchi et al.

[11] Patent Number: 4,807,180
[45] Date of Patent: Feb. 21, 1989

[54] MULTIPLE CONTROL SYSTEM FOR DISK STORAGE AND METHOD FOR REALIZING SAME

[75] Inventors: Hisaharu Takeuchi; Akira Kurano; Yoshiro Shiroyanagi; Hisashi Takamatsu; Katsunori Nakamura, all of Odawara, Japan

[73] Assignee: Hitachi, Ltd., Tokyo, Japan

[21] Appl. No.: 932,027

[22] Filed: Nov. 18, 1986

[30] Foreign Application Priority Data

Nov. 20, 1985 [JP] Japan .................. 60-260395

[51] Int. Cl.[4] ............................................. G06F 13/14
[52] U.S. Cl. ....................................................... 364/900
[58] Field of Search ... 364/200 MS File, 900 MS File; 360/86, 97, 105; 369/178

[56] References Cited

U.S. PATENT DOCUMENTS

| | | | |
|---|---|---|---|
| 4,207,609 | 6/1980 | Luiz et al. | 364/200 |
| 4,215,400 | 7/1980 | Denko | 364/200 |
| 4,371,929 | 2/1983 | Brann et al. | 364/200 |
| 4,413,317 | 11/1983 | Swenson | 364/200 |
| 4,494,215 | 1/1985 | Koike et al. | 364/900 |
| 4,525,801 | 6/1985 | Kuwabara | 364/900 |

OTHER PUBLICATIONS

R. Freedland, Intelligente Disklanfwerke: Zukunft der Systemintegration, Der Elektroniker 8-1984, pp. 58-61.
R. Snivery, Multitasking controller speeds throughput to multiple disks, Electronic Design, Jan. 1984, pp. 127-136.

Primary Examiner—Thomas M. Heckler
Assistant Examiner—Debra A. Chun
Attorney, Agent, or Firm—Fay, Sharpe, Beall, Fagan, Minnich & McKee

[57] ABSTRACT

When a disk controller receiving an access from a host computer to a disk device is connected with a disk connection device, if a relevant disk is used by another disk controller, positioning data for seek, set file mask and set sector are queued in a common memory. When the relevant disk becomes free, the disk controller reads the queued information and requires the disk device for positioning. A request of a reconnection with the host computer is issued from the disk controller informed by the disk unit, which has finished positioning at the position specified by the positioning data, search of an aimed record and a read/write operation of transmitted data are effected without any new intervening of an access program of the host computer.

11 Claims, 6 Drawing Sheets

FIG. 3
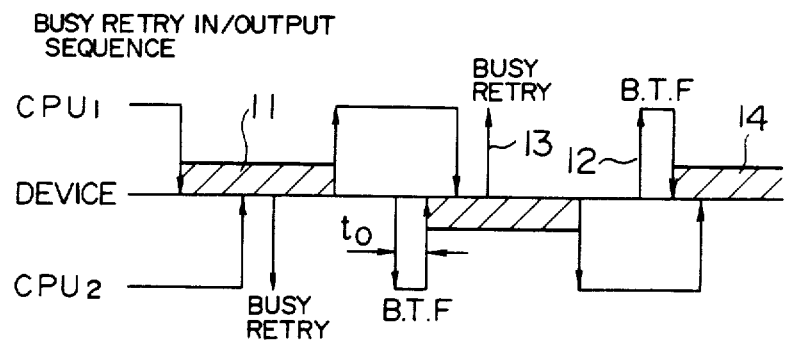
FIG. 4
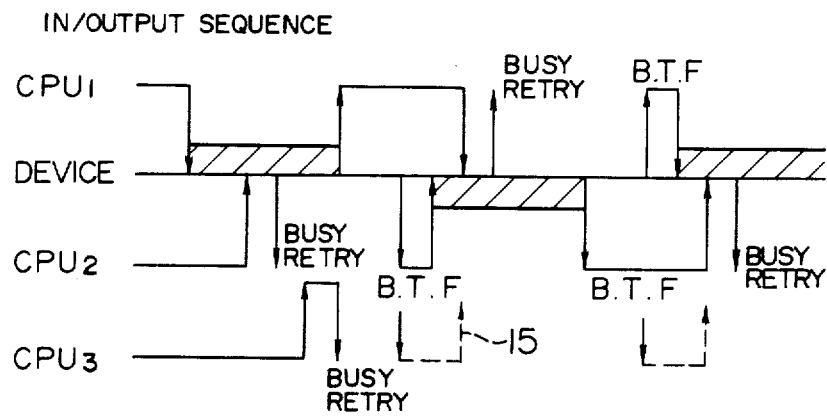
FIG. 5
COMMAND CHAIN
| ⓐ | SEEK |
| ⓑ | SET FILE MASK |
| ⓒ | SET SECTOR |
| ⓓ | SEARCH |
| ⓔ | READ/WRITE |

F I G. 9
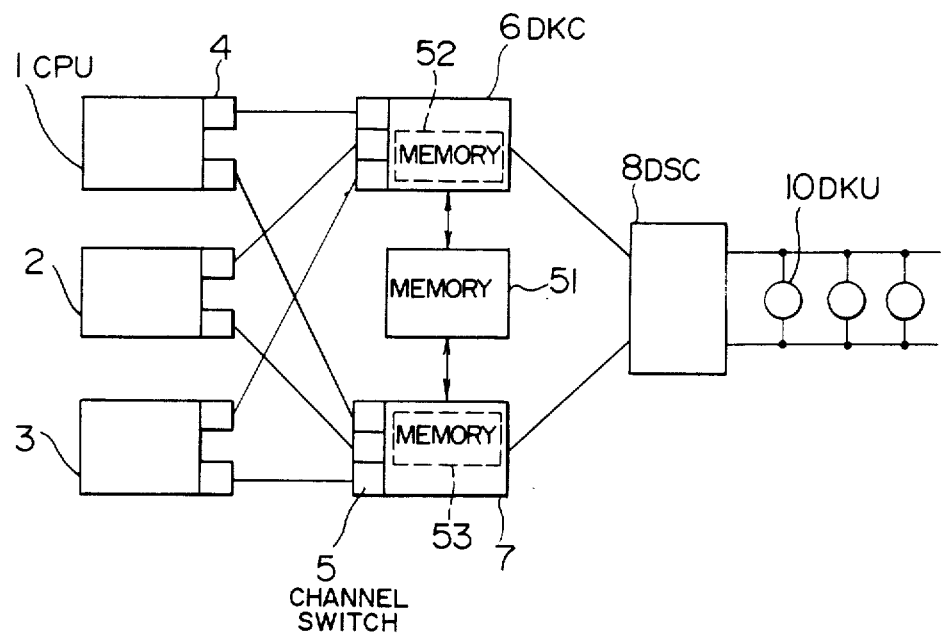

MULTIPLE CONTROL SYSTEM FOR DISK STORAGE AND METHOD FOR REALIZING SAME

FIELD OF THE INVENTION

This invention relates to a multiple control system for a rotating disk memory device and in particular to a multiple control system for disk permitting to process uniformly in/output commands coming from a plurality of host CPUs and to increase throughputs of disk subsystems and to a method for realizing same.

BACKGROUND OF THE INVENTION

U.S. Pat. No. 4,207,609 discloses a system used in common in circumstances, where files are shared.

In a magnetic disk subsystem, in some cases, a system, where a disk device is shared by a plurality of CPUs, i.e. a multiple control system is used. For example, in the case where a magnetic disk device 10 is utilized by 3 systems, as indicated in FIG. 1, each of CPUs 1 to 3 has 2 access paths to the disk device 10. An input command coming from each of the CPUs accesses the destination disk device through a channel 4, a channel switch 5, a magnetic disk control device (hereinbelow abbreviated to DKC) 6, 7 and a disk connection device (hereinbelow abbreviated to DSC) 8. A memory 9 in the DSC 8 stores data of channel command during utilization of the device and is used in common by a plurality of paths.

In this case it is usual that an in/output device shared by a plurality of hosts reports, when it is being operated under a command from a host, for a command from another host that it is busy and after the termination of the operation it sends a busy to free report to the host to whom it has reported to be busy. However, depending on circumstances of the utilization of the system, a following problem may occur. That is, in circumstances where a host gives commands successively to a device, when another host gives a command to the same device, it receives a report that the device is busy, if the device is being operated, and gives again the same command, if it receives a busy to free report, after the termination of the operation. At this moment, if the same device is being again operated, it receives again a report that the device is busy. There can be produced cases where these circumstances are repeated and no command from the other host cannot be processed.

FIG. 2 is a sequence chart showing these circumstances, illustrating a case where 2 CPUs access an in/output device. At first, CPU 1 catches the device and carries out operations such as seek of read/write head, search, read/write, etc. (period indicated by hatching). During this period, if CPU 2 gives an in/output command to the device, since it is used by CPU 1, the device reports DEVICE BUSY to CPU 2. After that, at a point of time, where the operation for CPU 1 is terminated, the device sends a busy to free report to CPU 2 in order to demand to send again the same command. Receiving the report, CPU 2 gives again the same command. However, in the case where CPU 1 accesses the same device several times repeatedly, a new command from CPU 2 encounters again DEVICE BUSY. Therefore, even if a B.T.F. report is sent to CPU 2, since the device is used again by CPU 1, after a time $t_1$ has passed away, at a point of time where a new command is given again by CPU 2, CPU 2 cannot use the in/output device.

Next, in a method for resolving this problem, "BUSY RETRY" can be applied, which is a function in a channel interface indicated in FIG. 3. During a period of time, where CPU 1 uses the device, everytime when CPU 2 gives a command thereto, a control device 5 or 6 sends a "BUSY RETRY" to CPU 2. Receiving it, the host CPU 2 judges that the command has been received by the device and enters into a state, where it waits a command termination report from the control device. After the termination of an operation 11 of the device for CPU 1, the control device connects again the device with the channel, which has asked the BUSY RETRY, and reports B.T.F. to CPU 2 in order to ask it to give again the command. In this case, since the operations from the reconnection with the channel to the reissue of the command can be carried out at the channel level, the time necessary therefor ($t_0$ in FIG. 3) is considerably shortened with respect to that ($t_1$ in FIG. 2) from the BUSY TO FREE report to the reissue of the in/output command according to the prior art techniques. The channel gives again the command asked to retry and the control device processes the command at first and others thereafter. Consequently, even in the case where CPU 1 uses the in/output device repeatedly, since the reissued command from CPU 2 can access the control device earlier than the next command from CPU 1, CPU 2 can use the device, after CPU 1 has terminated to use it at first. Then, after the operation at the command from CPU 2 has been terminated, a BUSY TO FREE report indicating that the device is set free is sent to CPU 1. Since a BUSY RETRY is given previously to CPU 1, the reissue of a second command, which has been already stored in the channel, is carried out immediately and then CPU 1 can use the device subsequently as indicated by 14 in FIG. 3. In this way 2 hosts can use the device alternatively. Since the reissue of the command at the channel level requires no intervention of the hosts, it can be carried out generally within a period of time from an in/output command termination report to the issue of the following command, but in the case where timing of the report by the control device is retarded or due to the fact that the performance of the CPUs is ameliorated, it can happen that the device cannot be used alternatively and thus further improvement thereof is needed.

FIG. 4 is an operation sequence chart in this case. In the case where CPU 2 accesses the device and after that CPU 3 also accesses it during a period of time, where CPU 1 uses the device, since both of them ask the reconnection, BUSY RETRYs are sent to both. At the point of time, where the use of the device by CPU 1 is terminated, a termination report is sent to of CPUs 2 and 3. Supposing that the performance of CPU 3 is slightly worse than that of CPU 2, the reissue, indicated by 15 in FIG. 4, of the command from CPU 3 is later than that from CPU 2. Finally, in the case where CPUs 1 and 2 use the device repeatedly, CPU 1 and CPU 2 use the device alternatively and CPU 3 can never use it.

SUMMARY OF THE INVENTION

An object of this invention is to provide a multiple control system for magnetic disk permitting to resolve these problems of the prior art techniques, to carry out commands from a plurality of hosts in a proper order in an in/output device, which is used in common by a plurality of systems or hosts and to shorten processing time for BUSY and BUSY TO FREE reports.

Another object of this invention is to eliminate operations concerning overhead by the fact that an in/output device subsystem receiving in/output commands from a plurality of hosts processes them in the order of their issue.

Still another object of this invention is to provide a processing method utilizing a memory, which is already incorporated in a magnetic disk subsystem, arranging cross calls coming from a plurality of disk control devices, and thus making the disk device work in a proper order.

A multiple control system for magnetic disks according to this invention is characterized in that a multisystem, in which a plurality of host CPUs use magnetic disk devices in common, comprises means for memorizing access positions of in/output requests given by each of the CPUs, file control information, information on the reception order, etc. for each of the magnetic disk devices and when an in/output request is issued, even if a relevant magnetic disk device is busy, after having received information concerning the in/output request, as if the request were carried out immediately, and memorized the information in the memory means, the information is read out from the memory means in a specified order, the disk device is accessed on the basis of the information and the in/output request is carried out, at the point of time where the process, which has been in the course, is terminated.

BRIEF DESCRIPTION OF THE DRAWINGS

FIGS. 3 and 4 are operation sequence charts obtained in the course, of studies for this invention;

FIG. 5 is a scheme indicating a command chain containing a decomposed in/output command to a magnetic disk;

FIG. 9 is a scheme illustrating the construction of a magnetic disk subsystem, which is another embodiment of this invention.

DESCRIPTION OF THE PREFERRED EMBODIMENTS

Figure 1:
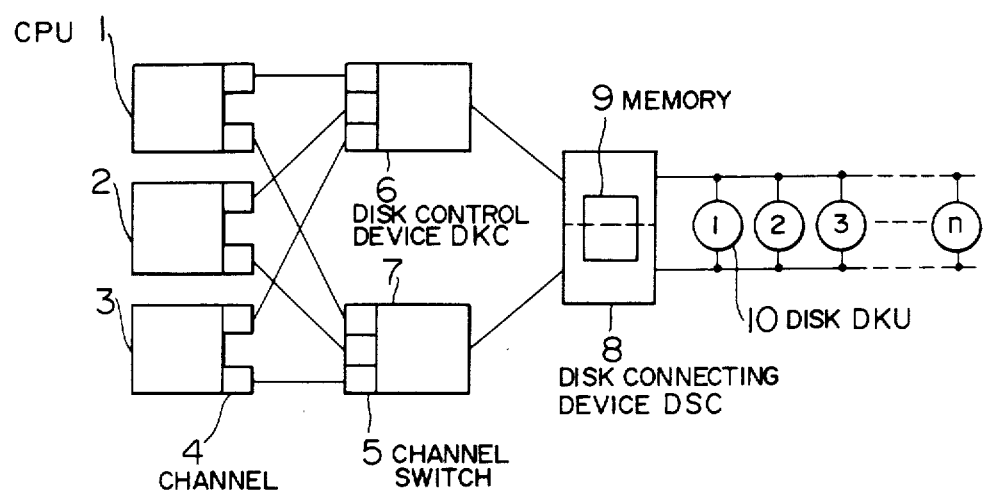
FIG. 1 is a scheme illustrating the construction of a magnetic disk subsystem, t which this invention can be applied.
Figure 2:
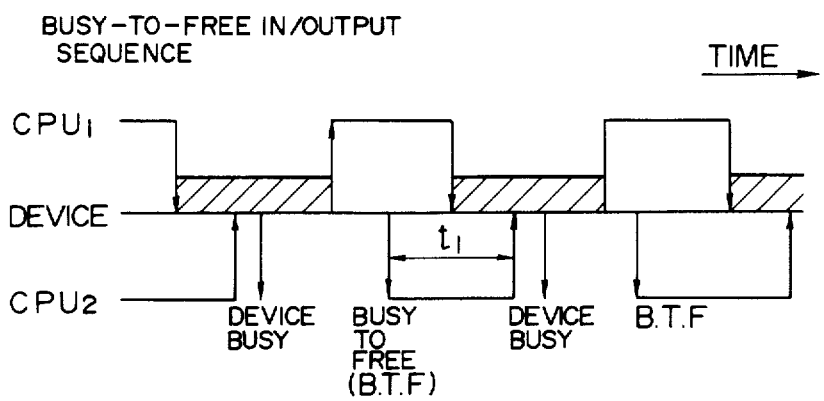
FIG. 2 is an operation sequence chart for a prior art multiple control.
Figure 6:
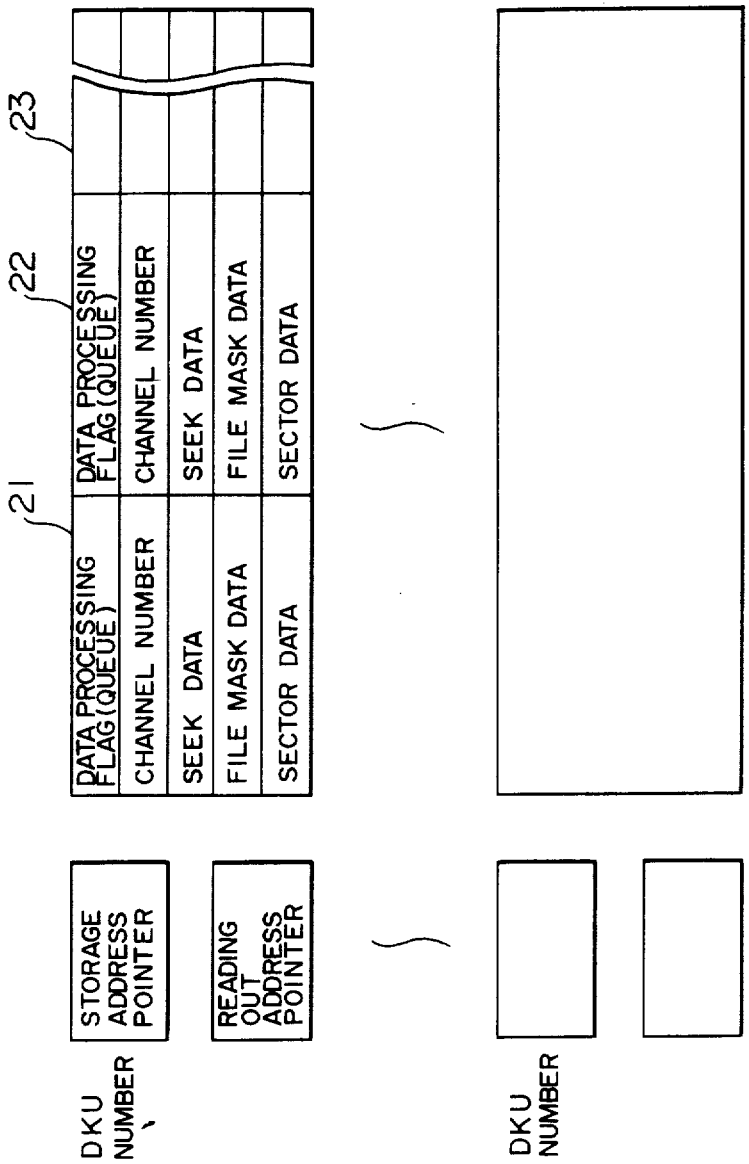
FIG. 6 indicates the content of a memory table used in common according to this invention.

Hereinbelow some preferred embodiments of this invention will be explained in detail, referring to the drawing. FIGS. 5 and 6 are schemes for explaining the basic conception of this invention. In the case where a magnetic disk subsystem as indicated in FIG. 1 is operated, an in/output command is usually decomposed into various elements of a command chain, as indicated in FIG. 5, in a channel 4 and sent to a magnetic disk controller DKC 6, 7. That is, a command chain for a magnetic disk is constituted generally by (a) a seek command for displacing the head to a pertinent cylinder, (b) a set file mask command for specifying the conditions for the file access, (c) a set sector command for specifying the sector position within one track, (d) a search command for looking for an aimed record in the track, and (e) a read/write command for reading/writing the aimed record.

In the case where a plurality of hosts give commands to a device, which is in the course of an operation, those commands are stored in a memory 9 within a magnetic disk subsystem 8 in the order of their issue. At the point of time, where the operation is terminated, the commands are read out successively from the memory within the scope of or at the level of the disk control device without intervening of the hosts/channels of higher rank and carry out of the commands is begun again.

FIG. 6 is a scheme illustrating the structure of a table in the common memory used for realizing this invention. Among the various elements of the command chain indicated in FIG. 5 the seek data, the file mask data the sector data, the issued channel number of the command chain and the efficacity of the pertinent memory area, and a data processing flag indicating the queuing of an instruction chain are prepared as many as the hosts for each of DKUs in the form of a unit of data. That is, 3 units of data 21 to 23 are prepared for the system indicated in FIG. 1. In order to access those data, within the same common memory are set a storage address pointer specifying an area for storing the succeeding data and a read out address pointer indicating the area of the data to be subjected to a read out process at that time. That is, as indicated in FIG. 6, for DKU 0-n are set the storage address pointer, the read out address pointer, and the common memory table. Further, in the common memory table are set storage areas as many as the hosts, which can be connected to one magnetic disk memory. For example, in the case indicated in FIG. 1, 3 units areas are disposed in one common memory and only when it is accessed, a data processing flag, a channel number, seek data, file mask data and sector data are written in an area corresponding thereto.

Figure 7:
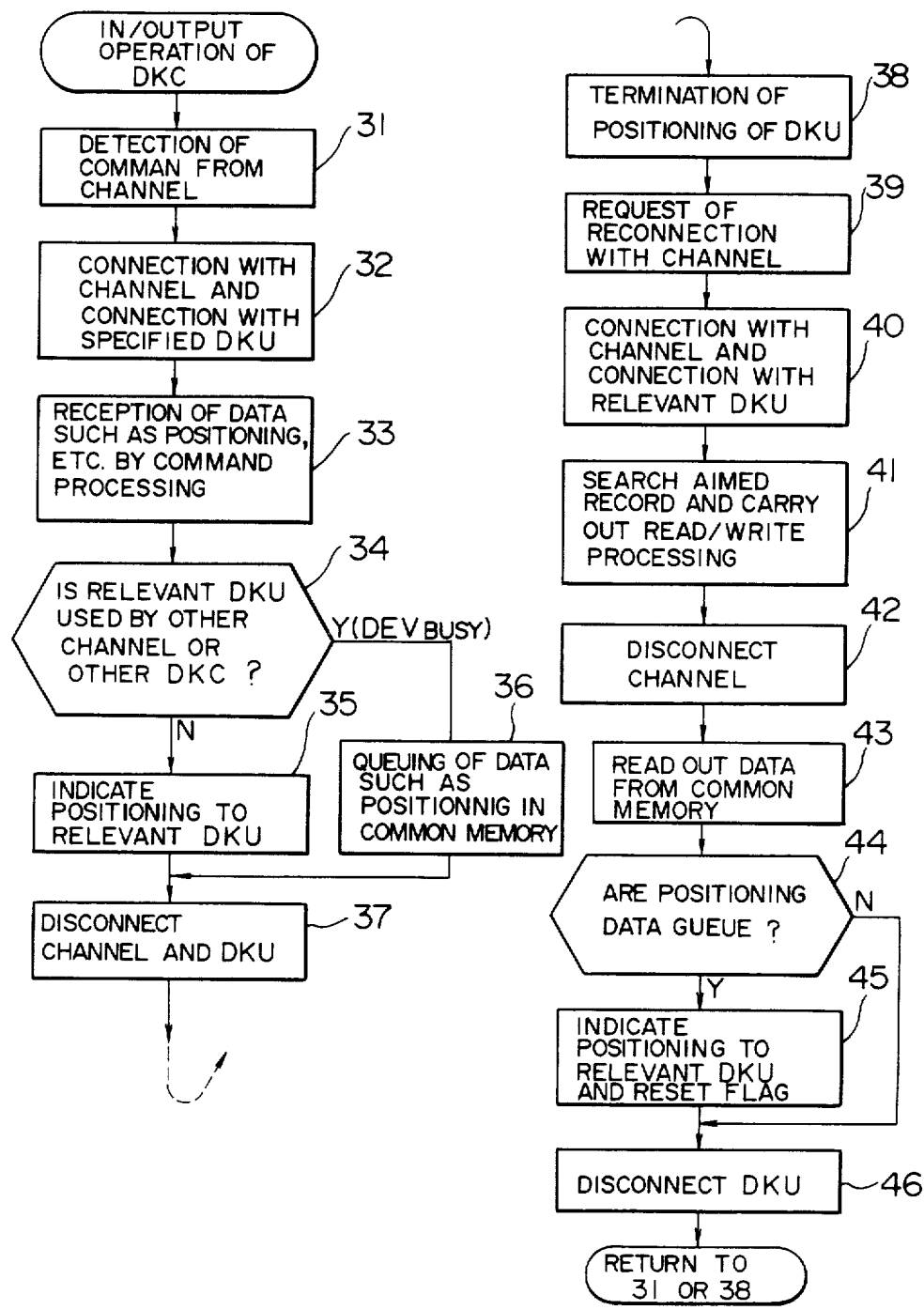
FIG. 7 is a flow chart of an in/output operation of a disk control device, which is an embodiment of this invention.

FIG. 7 is an operation flow chart for DKC showing an embodiment of this invention. At first, when an in/output command is given b a CPU, the corresponding channel makes the aimed DKC 6 or 7 start. When the DKC detects it (STEP 31), it is connected with the pertinent channel 4 and at the same time with the specified DKU (STEP 32). When the commands a to e indicated in FIG. 5 are given by the channel, the DKC receives data such as head positioning, etc. for a, b and c among the elements of the command chain (STEP 33). The DKC judges whether the specified DKU is used by another channel or another DKC or not (STEP 34).

When the relevant DKC can use it, positioning is indicated to the DKU specified and connected at that time by using the positioning data stated above (STEP 35) and the channel and the DKU are disconnected (STEP 37). In this way, the DKU enters into an idle state. The termination of the positioning of the DKU is detected by measuring the elapse of time (STEP 38) and a reestablishment of the connection with the channel is requested (STEP 39). An aimed record is searched and a read/write processing is carried out (STEP 41) by transmitting data to and from the channel. When a command chain has been carried out, then the channel is disconnected (STEP 42) and data are read out from the common memory (STEP 43). When the positioning data are not queued in the common memory (STEP 44), the DKU is disconnected (STEP 46) and in this way the processing is terminated. Then, returning to the starting point, the system waits for another command from the channel (STEP 31).

Next, among the operations described above, the operations of a relevant DKC, in the case where the DKU is used by another channel or another DKC, will be described.

In FIG. 7, after the data such as positioning, etc. have been received (STEP 33) in the command processing with the channel, in the case where the relevant DKU is used (STEP 34), those data are queued in the common memory (STEP 36) and the channel is disconnected (STEP 37). At the point of time, where the processing of the DKU, which was already in the course, is terminated, the channel is disconnected (STEP 42) and data for each of the disk units are read out from the common memory for the following read/write operation (STEP 43). In this case, since the data such as positioning, etc. are queued in an area for the DKU in the common memory, positioning is indicated to the relevant DKU connected at that time (STEP 45) and the DKU is disconnected (STEP 46).

At this moment the DKU enters an idle state. After that, the detection of the positioning termination for the DKU (STEP 38), the request of the reconnection with the channel (STEP 39), the search of an aimed record and carrying out of the read/write processing (STEP 41) are successively effected. When they are terminated, the channel is disconnected (STEP 42). Then data are read out from the common memory (STEP 43) and the aforementioned separations are repeatedly effected. Further, in the case where there are a plurality of queued data 21, 22, 23, ..., the data 21, which have been inputted at first, are read out and their positioning is indicated to the DKU (STEP 45).

Figure 8:
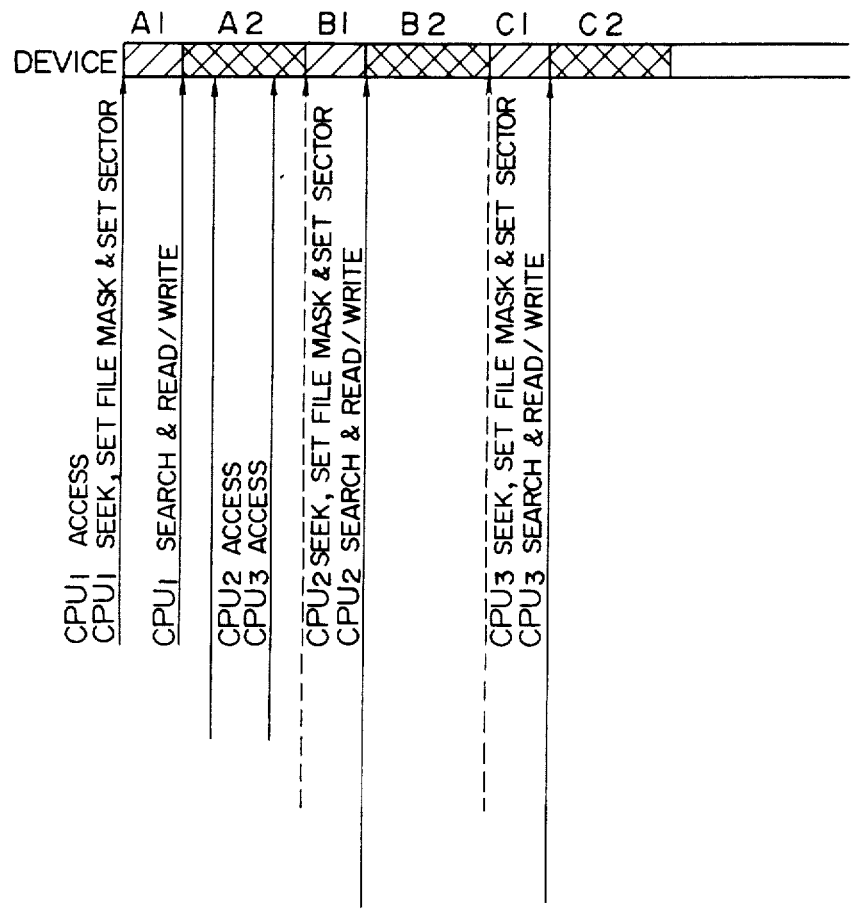
FIG. 8 is an operation sequence chart for a system indicated in FIG. 1, in which 3 hosts are used.

FIG. 8 is a sequence chart illustrating time sequentially the operations indicated in FIG. 7. In the case where 3 CPUs are used for one in/output device, the CPU 1 is accessed at first. When it is not used, the positioning of the DKU is indicated. When the channel and the DKU is disconnected (STEP 37), the seek command, the set file mask command and the set sector command indicated in FIG. 5 are carried out (period of time indicated by A1 in FIG. 8). When they are terminated, the channel and the DKC are connected with the DKU. Then an aimed record search and read/write operation is effected and data are transmitted (period of time indicated by A2). When the device is used by CPU 1 (A2) and CPU 2 and CPU 3 access the device, the seek data SK, the set file mask data SFM and the set sector STSCT are written in the common memory. When the transmission of data from CPU 1 is terminated, the following positioning data from CPU 2 is read out from the common memory, the positioning is indicated to the DKU and the DKU is disconnected (period of time indicated by B1). When the positioning is terminated, the channel and the DKC are connected with the DKU, the aimed record are searched and the read/write processing is effected (period of time indicated by B2). Next, the positioning data from the CPU 3 are read out from the common memory, the positioning of the DKU is indicated and the DKU is disconnected (period of time indicated by C1). When the positioning is terminated, the search command and the read/write command are effected (period of time indicated by C2). Since the commands are written in the common memory in the order of their access, read out in this order and the device is used sequentially, it is used without any useless waiting time and even if a plurality of hosts having different performances use an in/output device in common, all the hosts can use it uniformly.

Hereinbelow the common memory will be explained.

A magnetic disk subsystem as indicated in FIG. 1 is provided with a memory 9 within the disk connection device (DSC) 8, which memory can be used in common for cross-calls from a plurality of DKCs. This is disposed in order that, since, in the case where the DKC and the channel are disconnected, after the positioning data to the DKU have been received, and the connection is reestablished upon the termination of the positioning of the DKU, the accessed DKC cannot be connected,, because it is used for another processing, the rotation of the disk is waited and after that also the rotation may be repeatedly waited, the CPU numbers, etc. are memorized in the memory within the DSC 8 for the purpose of reducing the number of these rotation waits, and that even if the accessed DKC is busy, the CPU is connected through another DKC, which is free, so that it is possible to request a search command and a read/write command. In this embodiment it is possible to memorize the command chain, utilizing this memory within the DSC 8.

Further, as indicated in FIG. 9 it is also possible to provide with common tables as indicated in FIG. 6 in the memory 51 for the mutual communication and connection between the DKC 6 and 7 or in the memories 52, 53 (indicated by broken lines) storing command chains from the channels disposed within the DKCs 6, 7.

Although the embodiments described above relate to a magnetic disk device and a magnetic disk subsystem, this invention can be applied for scanning of an optical system, set file mask, set sector, search, read/write in a rotating disk memory device such as other optical disk, opto-megnetic disk, compact disk, etc. and take expected effects.

We claim:

1. A disk storage multiple control method for a multi-system accessed by a plurality of host CPU's connected with a plurality of disk controllers by sharing each of rotating disk storages in common, by which an access request issued by each of the hosts is sent to a specified disk storage and a read/write operation is performed, comprising:
   (a) a step of reading/writing a data stored in said specified disk storage according to commands given by said hosts by controlling a head system for accessing said specified disk storage;
   (b) a step memorizing positioning information for the head system of said specified disk storage necessary for said access in response to a state that said specified disk storage is busy when another of said hosts accesses said disk storage;
   (c) a step of transmitting said positioning information to said specified disk storage, responding to a busy to free report of said specified disk storage; and
   (d) a step of reading/writing memory information specified by said access to said specified disk storage.

2. A disk storage multiple control method according to claim 1, wherein said step of memorizing positioning information comprises a substep of queuing access requests from said plurality of hosts for each of said rotating disk storages in a common memory within a disk connecting device (DSC) to perform them in proper order and said step of transmitting said positioning information comprises a substep of giving said positioning information in said order to said specified disk storage, responding to the busy to free report of said specified disk storage, which has been in the course of use.

3. A disk storage multiple control method according to claim 2, wherein, after the positioning information sent by said disk controller to said specified disk storage has been received from said host, said host is disconnected so as to permit the connection from said host to another disk controller or the connection from said disk controller to another disk storage.

4. A disk storage multiple control method according to claim 1, wherein said positioning information comprises an access position, storage file information and information concerning the order to the access queuing for said specified disk storage.

5. In a multisystem, in which a plurality of host CPUs share rotating disk devices multiple control method for rotating disks, comprising means for memorizing access positions of in/output requests given by each of the CPUs, file control information, and information concerning the reception order for each of the rotating disk devices and performing;
   (a) when an in/output request is issued, even if a relevant magnetic disk device is busy, the magnetic device receives information concerning the in/output request, as if the request were carried out apparently;
   (b) memorizes said information in said memory means;
   (c) reads out the information from said memory means in a specified order at the point of time, where a processing, which has been in the course, is terminated; and
   (d) accesses the disk device on the basis of the information and carries out the in/output request.

6. A multiple control method for rotating disks according to claim 5, wherein said step of memorizing said information comprises a substep of memorizing flags indicating the order of in/output requests issued by said plurality of hosts and said step of reading out the information from said memory means comprises a substep of reading out said positioning information in the order of said in/output requests and sending them to said disk device.

7. A multiple control device for disk storage comprising:
   (a) a disk connection device connected with a disk storage for providing signals of positioning a read/write head for said disk storage and used in common by a plurality of hosts;
   (b) a plurality of disk control devices connected with each of said hosts connected with said disk connection device; and
   (c) a memory for memorizing positioning data for positioning a read/write head for said disk storage at a specified position, responding to said signals coming from said disk connection device;
   wherein, when said disk connection device is accessed by one of said plurality of hosts through one of said disk control devices, if the disk storage, which is to be used, is busy, said positioning data stored in said memory are sent to said disk storage s soon as the use state at that time is terminated.

8. A multiple control device for disk storage according to claim 7, wherein said memory comprises a location for memorizing the order of access from said hosts in a form corresponded to said positioning data.

9. A multiple control device for disk storage according to claim 7, wherein said plurality of hosts comprise channel switches used for transmitting storage data subsequently to the termination of the transmission of said positioning data to said olurality of disk control devices.

10. A multiple control device for disk storage according to claim 9, wherein said channel switches are disconnected after the termination of the transmission of said positioning information or said storage data for said disk control device so as to permit the connection with another disk control device.

11. A disk storage multiple control method for a multisystem accessed by a plurality of host CPUs connected with a plurality of disk controllers by using rotating disk storages in common, by which an access request issued by each of the hosts is sent to said disk storages and a read/write operation is effected, comprising:
   (a) a step of reading/writing the storage data according to commands given by said hosts by controlling a head system for accessing said storage data,
   (b) memorizing positioning information for the head system of said disk device necessary for said access, into a common memory (9) commonly accessibly from each of said plurality of disk controllers residing on a plurality of paths between said plurality of host CPUs and said disk storages, if the disk storage is busy by one of said hosts, when another of said hosts accesses said disk storage,
   (c) reading out said positioning information from said common memory in preparing next reading/writing operation after disconnecting said one host from said plurality of disk controllers after said disk storage is not busy so as to transmit said positioning information to said disk device,
   (d) reading/writing memory information specified by said access to said disk device, and
   (e) disconnecting said disk storage from said disk controllers if said positioning information toward said disk storage is not found in said common memory.

* * * * *